United States Patent [19]

Umeda et al.

[11] Patent Number: 5,089,553
[45] Date of Patent: Feb. 18, 1992

[54] COPOLYMERIZED POLYESTER COMPOSITIONS

[75] Inventors: Takashi Umeda; Seiichi Zemba, both of Ichihara; Kazuo Hara, Kurashiki; Katsunori Takamoto, Kurashiki; Shinichi Yokota, Kurashiki, all of Japan

[73] Assignees: Idemitsu Petrochemical Co., Ltd., Tokyo; Kuraray Company Limited, Kurashiki, both of Japan

[21] Appl. No.: 397,034

[22] Filed: Aug. 21, 1989

[30] Foreign Application Priority Data

Aug. 30, 1988 [JP] Japan .................. 63-213745
Aug. 30, 1988 [JP] Japan .................. 63-213746

[51] Int. Cl.$^5$ .................. C08F 8/00; C08L 67/02
[52] U.S. Cl. .................. 524/424; 524/413; 524/445; 524/447; 524/449; 524/451; 524/452; 524/456; 524/508; 524/514; 524/539; 524/847
[58] Field of Search .................. 525/173, 174, 175; 528/302; 524/424

[56] References Cited

U.S. PATENT DOCUMENTS

| | | | |
|---|---|---|---|
| 3,639,527 | 2/1972 | Brinkmann et al. | 260/873 |
| 4,322,335 | 3/1982 | Nield | 525/176 |
| 4,548,978 | 10/1985 | Garrison, Jr. | 524/314 |
| 4,772,652 | 9/1988 | Yoshifumi et al. | 524/394 |
| 4,931,538 | 6/1990 | Yoshifumi et al. | 528/302 |

*Primary Examiner*—Kriellion S. Morgan
*Assistant Examiner*—Yong S. Lee
*Attorney, Agent, or Firm*—Frishauf, Holtz, Goodman & Woodward

[57] ABSTRACT

The present invention relates to a novel copolymerized composition characterized in that it comprises (A) 100 parts by weight of a copolymerized polyester containing (a) an aromatic dicarboxylic acid unit composed mainly of a terephthalic acid unit, (b) a glycol unit composed mainly of an ethylene glycol unit, (c) a polytetramethylene glycol unit, (d) a polyethylene glycol unit and (e) an aliphatic dicarboxylic acid unit having 9 or more carbon atoms, (B) 5 to 150 parts by weight of a reinforcing substance and (C) 1 to 10 parts by weight of a metal salt of an ionic copolymer.

The copolymerized polyester compositions of the present invention retain excellent heat resistance and rigidity that the glass fiber-reinforced polyethylene terephthalate compositions possess originally and are considerably improved in terms of low-temperature moldability, toughness, alkali resistance and like other factors.

14 Claims, No Drawings

COPOLYMERIZED POLYESTER COMPOSITIONS

BACKGROUND OF THE INVENTION

1. Field of the Invention

The present invention relates to a novel copolymerized polyester composition. More specifically, the present invention is concerned with a copolymerized polyester composition which does not only excel in heat resistance and rigidity but is also much improved in terms of low-temperature moldability, toughness, alkali resistance and so on, and is suitably used in automotive fields, especially in the form of engine-related parts needed to have heat resistance.

2. Background Information

Heretofore, polyethylene terephthalate has been widely used as materials for fibers, films and various moldings because of their outstanding heat resistance, chemical resistance, mechanical properties, electrical properties and other properties. When such polyethylene terephthalate is used as a molding material, it is well-known to incorporate therein an inorganic filler such as glass fibers for the purpose of bettering the strength, rigidity, heat resistance and like other factors of moldings.

When such glass fiber-reinforced polyethylene terephthalate compositions are to be used for injection molding purposes, however, some problems arise due to their limited rate of crystallization at low temperatures. For instance, when they are injection-molded at a mold temperature of 130° C. or below, they tend to provide moldings poor in surface hardness, rather than well-crystallized moldings. Moreover, when such moldings are used at a temperature exceeding their second-order transition point, they undergo crystallization so excessive that their shape stability deteriorates.

There is also available a certain molding technique which is carried out at a mold temperature of some 50° C. to obtain a molding in which polyethylene terephthalate is not substantially crystallized and which is in turn heat-treated. However, problems with this molding technique are that its productivity drops unavoidably and it provides moldings crystallized by heat treatment and so subjected to volumetric shrinkage, deformation, etc.

Consequently, the polyethylene terephthalate compositions have still been molded using special molding machines with which a mold temperature of 130° C. or higher is usually achieved. Since such molding machines have been unsuitable for general purposes, however, there has been a demand for polyethylene terephthalate compositions so improved in terms of low-temperature moldability that moldings of improved quality can be obtained with a conventional molding machine operable at a mold temperature of 90° C. to up to 110° C.

For that reason, various polyethylene terephthalate compositions having a low-temperature crystallization effect have been proposed until now. For instance, U.S. Pat. No. 4,548,978 teaches a method for incorporating known nucleating agents into polyethylene terephthalate copolymerized with polyalkylene glycols. However, such a method has failed to obtain any moldings of good quality at a mold temperature of 100° C. or lower. In addition, Japanese Patent Publication No. Sho.46-29977 discloses a composition which contains polyethylene terephthalate or glass fiber-containing polyethylene terephthalate with sodium benzoate; Japanese Patent Publication No. Sho.47-14502 discloses a composition which contains lithium terephthalate, lithium stearate or lithium benzoate, and Japanese Patent Publication No. Sho.45-26225 discloses a composition in which an ionic copolymer consisting of an a-olefin and a salt of an $\alpha,\beta$-unsaturated carboxylic acid is added to polyethylene terephthalate. However, such compositions are still less than satisfactory, although improved more or less in terms of low temperature moldability.

Besides having the disadvantage of being poor in low-temperature moldability, polyethylene terephthalate has additional disadvantages of being not only inferior in toughness to polybutylene terephthalate but being also still unsatisfactory in terms of alkali resistance. As copolymerized polyesters in which the toughness of polyethylene terephthalate is improved, a copolymerized polyester obtained by the copolymerization of a polyalkylene glycol with an aliphatic dicarboxylic acid has been proposed (see Japanese Patent Laid-Open Publication No. Sho.62-280221). If glass fibers and a nucleating agent are added to such a copolymerized polyester, then products are obtained, which possess toughness substantially equivalent to that of polybutylene terephthalate. Still, such toughness is not satisfactory altogether. Never until now have any proposals been made of improvements in alkali resistance.

Although excelling in heat resistance and rigidity, the conventional glass fiber-reinforced polyethylene terephthalate compositions are disadvantageous in that they are not only poor in low-temperature moldability and toughness as mentioned above, but are also lacking in alkali resistance.

SUMMARY OF THE INVENTION

It is an object of the present invention to overcome the defects of the prior art glass fiber-reinforced polyethylene terephthalate by the provision of a copolymerized polyester resin composition which, in addition to having excellent heat resistance and rigidity, is much improved in terms of low-temperature moldability, toughness, alkali resistance and so on.

As a consequence of intensive and extensive studies made to develop a copolymerized polyester composition having such preferable properties, the present inventors have now found that the above object is attainable by incorporating to a specific copolymerized polyester a specific proportion of a reinforcing substance and a metal salt of an ionic hydrocarbon copolymer serving as a nucleating agent, and have accomplished the present invention based on such findings.

According to one or the first aspect of the present invention, there is provided a copolymerized polyester composition characterized in that it comprises (A) 100 parts by weight of a copolymerized polyester containing (a) an aromatic dicarboxylic acid unit composed mainly of a terephthalic acid unit, (b) a glycol unit composed mainly of an ethylene glycol unit, (c) a polytetramethylene glycol unit, (d) a polyethylene glycol unit and (e) an aliphatic dicarboxylic acid unit having 9 or more carbon atoms, provided that 0.3 to 10 parts by weight of said unit (c), 0.5 to 20 parts by weight of said unit (d) and 0.3 to 10 parts by weight of said unit (e) are contained per a total of 100 parts by weight of said units (a) and (b), (B) 5 to 150 parts by weight of a reinforcing substance and (C) 1 to 10 parts by weight of a metal salt of an ionic copolymer.

According to another or the second aspect of the present invention, there is provided a copolymerized polyester composition characterized in that it comprises (A') a copolymerized polyester containing (a) an aromatic dicarboxylic acid unit composed mainly of a terephthalic acid unit, (b) a glycol unit composed mainly of an ethylene glycol unit, (e) an aliphatic dicarboxylic acid unit having 9 or more carbon atoms and (c) a polytetramethylene glycol unit, provided that 0.2 to 20 parts by weight of said unit (e) and 0.2 to 20 parts by weight of said unit (c) are contained per a total of 100 parts by weight of said units (a) and (b), (A") a copolymerized polyester containing said units (a) and (b) and (d) a polyethylene glycol unit; provided that 0.3 to 50 parts by weight of said unit (d) are contained per a total of 100 parts by weight of said units (a) and (b), (B) a reinforcing substance and (C) a metal salt of an ionic copolymer; of said copolymerized polyester (A') and (A"), said units (e), (c) and (d) being contained in the respective amounts of 0.3 to 10 parts by weight, 0.3 to 10 parts by weight and 0.5 to 20 parts by weight per a total of 100 parts by weight of said units (a) and (b) and said reinforcing substance (B) and said metal salt of an ionic copolymer (C) being contained in the respective amount of 5 to 150 parts by weight and 1 to 10 parts by weight per a total of 100 parts by weight of said copolymerized polyesters (A') and (A").

DETAILED DESCRIPTION OF THE INVENTION

Referring now to the first composition of the present invention, the unit (a) in the copolymerized polyester used as the component (A) in an aromatic dicarboxylic acid unit composed mainly of a terephthalic acid unit. Such an aromatic dicarboxylic acid unit (a) in the copolymerized polyester used as the component (A) may include terephthalic acid and a mixture of terephthalic acid with lower than 10 mol % of other aromatic dicarboxylic acids which, by way of example alone, may be represented by isophthalic acid, naphthalene-2,6-dicarboxylic acid, naphthalene-1,5-dicarboxylic acid, diphenyl-4,4'-dicarboxylic acid, methyl terephthalate, methyl isophthalate, diphenyl ether-4,4'-dicarboxylic acid, diphenyl thioether-4,4'-dicarboxylic acid, diphenylsulfone-4,4'-dicarboxylic acid, diphenyl ketone-4,4'-dicarboxylic acid and 2,2-diphenylpropane-4,4'-dicarboxylic acid. Such aromatic dicarboxylic acids, exclusive of terephthalic acid, may be used alone or in combination of two or more.

The unit (b) in the copolymerized polyester used as the component (A), i.e., the glycol unit composed mainly of an ethylene glycol unit, may include ethylene glycol and mixtures of ethylene glycol with less than 10 mol % of other glycols which, only by way of example, may be represented by aliphatic and alicyclic glycols such as diethylene glycol, 1,2-propylene glycol, 1,3-propanediol, 1,3-butanediol, 1,4-butanediol, 1,5-pentanediol, 1,6-hexanediol, 2,2-dimethyl-1,3-propanediol (neopentyl glycol), 1,4-cyclohexanediol and 1,4-cyclohexane dimethanol and aromatic diols such as hydroquinone, resorcin and bisphenols. They may further be copolymerized with hydroxycarboxylic acids such as hydroxybenzoic acid, hydroxycaproic acid and hydroxyethoxybenzoic acid. Such glycols, exclusive of ethylene glycol, may be used alone or in combination of two or more.

In the aforesaid copolymerized polyester, the polytetramethylene glycol forming the polytetramethylene glycol unit (c) and the polyethylene glycol constituting the polyethylene glycol unit (d) each have a number-average molecular weight in the range of 400 to 4000, preferably 600 to 2000. When the molecular weight exceeds 4,000, the resulting copolymerized polyester tends to decrease in rigidity. When the molecular weight is less than 400, no sufficient improvement in toughness is obtained.

In the first aspect of the present invention, the contents of the aforesaid polytetramethylene glycol unit (c) and polyethylene glycol unit (d) in the copolymerized polyester of the component (A) should be selected from the respective ranges of 0.3 to 10 parts by weight, preferably 0.5 to 5 parts by weight and 0.5 to 20 parts by weight, preferably 1 to 15 parts by weight per a total of 100 parts by weight of said units (a) and (b). When the contents of the units (c) and (d) are below the lower limits of the above defined scopes, on the one hand, no sufficient improvements in toughness and crystallinity at low temperatures are achieved. When they exceed the upper limits of the above defined scopes, on the other hand, the resulting copolymerized polyester tends to decrease in melting point and rigidity.

The unit (e) of the copolymerized polyester used as the component (A), i.e., the aliphatic dicarboxylic acid unit having 9 or more carbon atoms may be of a straight or branched chain, or may be of a partial ring structure. Examples of such an aliphatic dicarboxylic acid having 9 or more carbon atoms may include straight-chain dicarboxylic acids, such as azelaic acid, sebacic acid, decane dicarboxylic acids, brassylic acid, dodecane dicarboxylic acids, hexadecane dicarboxylic acids and eicosane dicarboxylic acids, and dimer acids or their hydrogenated products. Use may also be made of ester-forming derivatives of such dicarboxylic acids. Such aliphatic dicarboxylic acids or their ester-forming derivatives may be used alone or in combination of two or more.

Of the aforesaid aliphatic dicarboxylic acids, particular preference is given to dimer acids and their hydrogenated products. Such dimer acids are obtained from unsaturated fatty acids having 18 carbon atoms such as linolic acid and linolenic acid or their monovalent alcohol esters and contain as the main component a dimer acid having 36 carbon atoms, and may partly contain monobasic and trimer acids. In order to provide effective achievement of the object of the present invention, the dimer acid should preferably contain more reduced amounts of the monobasic and trimer acids.

In the copolymerized polyester, the content of the unit (e) is selected from the range of 0.3 to 10 parts by weight, preferably 0.5 to 5 parts by weight per a total of 100 parts by weight of the units (a) and (b). At below 0.3 parts by weight, on the one hand, no sufficient improvements in toughness are obtained. At a content exceeding 10 parts by weight, on the other hand, the resulting copolymerized polyester tends not only to decrease in melting point but also to lose rigidity.

The toughness of the copolymerized polyester is improved by modification with the polytetramethylene glycol or polyethylene glycol. However, more striking improvements in toughness are achievable by modification with the aliphatic dicarboxylic acid having 9 or more carbon atoms. This effect is unachievable by modification with an aliphatic dicarboxylic acid having 8 or less carbon atoms. Although no particular limitation is imposed upon the upper limit of the number of carbon atoms in the aliphatic dicarboxylic acids having 9 or more carbon atoms, the number of carbon atoms is usually up to 50.

Although not appreciated altogether as of today, the reason why the toughness of the resulting copolymerized polyester is more remarkably increased by modification with the aliphatic dicarboxylic acids having 9 or more carbon atoms is presumably as follows. Observation under a transmission type electronic microscope relying upon osmic acid dyeing has confirmed that the copolymerization of, e.g., a polyalkylene glycol alone with polyethylene terephthalate gives a polymerized product of a coarse phase-separation structure, while when such copolymerization is carried out in combination with the aliphatic dicarboxylic acid having 9 or more carbon atoms, the resulting polymer product is of a fine particle-dispersed structure. That is, changes in the morphology of phase separation appear to be correlated to striking improvements in toughness.

If the object of the present invention is otherwise achieved in the preparation of the copolymerized polyester that is the component (A), the components as already mentioned may be used in combination with small amounts of other copolymerizable components, for instance, polyfunctional compounds such as triols and tetraols represented by glycerin, trimethylolpropane, pentaerythritol, hexanetriol and 1,2,6-trimethylolethane, benzene tricarboxylates represented by trimellitic acid and trimesic acid, benzene tetracarboxylic acids such as pyromellitic acid, and hydroxycarboxylic acids represented by p-hydroxybenzoic acid, p-hydroxyethoxybenzoic acid and a compound containing 3 to 4 hydroxyl and carboxyl groups; and monofunctional compounds such as aliphatic monocarboxylic acids represented by stearic acid and oleic acid and aromatic monocarboxylic acids represented by benzoic acid, diphenyl acetate and $\beta$-naphthoic acid.

No particular limitation is placed upon the methods for preparing the copolymerized polyester used as the component (A) in the compositions of the present invention. This means that such polyester may be prepared in any suitable known methods. Usually, the copolymerized polyester may be prepared by heating a mixture of reactive components at atmospheric pressure or under pressure in the presence or absence of a catalyst, preferably in an inert gas atmosphere to form an oligomer and, then, polycondensing the oligomer. In this case, the acid component that is one starting material may be used in the form of an ester-forming derivative. The reaction temperature at which the oligomer is formed may usually be selected from the range of 200 to 270° C., preferably 230 to 260° C. The polycondensation of said oligomer may occur at a pressure of up to 15 mmHg, preferably up to 1 mmHg and a temperature of about 270 to 300° C. in the presence of known catalysts such as antimony, titanium, iron, zinc, cobalt, lead, manganese and germanium.

No particular limitation is placed on the time when the polytetramethylene glycol, polyethylene glycol and aliphatic dicarboxylic acid forming the units (c), (d) and (e), respectively, in the copolymerized polyester are to be added. This means that they may be added in any stage during the preparation of the copolymerized polyester. For instance, they may be added either at the stage of esterification or ester exchange or at the stage of polycondensation. Alternatively, they may be added after polycondensation, which is in turn continued to completion.

The intrinsic viscosity of the thus obtained copolymerized polyester that is the component (A) is desirously in the range of 0.4 to 1.5 dl/g, preferably 0.5 to 1.0 dl/g, as measured at a temperature of 30° C. in a mixed solvent of phenol/tetrachloroethane (at a weight ratio of 1/1).

The reinforcing substances used as the component (B) in the first composition of the present invention may include, only by way of example, a fibrous reinforcing material such as fibers based on glass, carbon, graphite, metal carbides, metal nitrides, potassium titanate, aramid and phenolic resin; and inorganic fillers such as talc, clay, kaolin, mica, asbestos, wollastonite, calcium silicate, silica, gypsum and graphite, and may be used alone or in combination of two or more. Among others, preference is given to the fibrous reinforcing substances, esp., glass fibers and carbon fibers.

The fibrous reinforcing substances used should suitably have a length of preferably 0.02 to 2 mm, more preferably 0.05 to 1 mm and a diameter of usually about 1 to 20 $\mu$m in the composition. The fibrous reinforcing substances may take any suitable forms such as, for instance, rovings, milled fibers, chopped fibers and whiskers.

For the purpose of improving the adhesion with respect to the copolymerized polyester, said reinforcing substances may further be treated on their surfaces with a coupling agent based on silane, titanate or chromium, silica powders, silicone oil, higher fatty acids, higher alcohols and waxes. Alternatively, they may be bundled together with an expoxy resin.

It is required that the reinforcing substance that is the component (B) be added in an amount of 5 to 150 parts by weight, preferably 10 to 120 parts by weight, per 100 parts by weight of the copolymerized polyester that is the component (A). At below 5 parts by weight, no sufficient mechanical strength, rigidity and heat resistance are obtained. In a quantity exceeding 150 parts by weight, on the other hand, no improvements in mechanical strength, rigidity and heat resistance are achieved relative to such an increased quantity and there is rather a tendency toward deteriorations of appearance and fluidity.

The metal salt of an ionic copolymer is added as the component (C) to the composition of the present invention. Although not particularly limited, the ionic copolymers used may include, for instance, copolymers of an olefin such as ethylene, propylene, butylene, styrene or $\alpha$-methylstyrene with an unsaturated carboxylic acid such as acrylic, methacrylic or maleic acid or an unsaturated carboxylic anhydride such as maleic anhydride. As the metal ion species forming the metal salts of such ionic copolymers, reference may be made to various ones, for instance, alkaline metal ions such as sodium and potassium ions, alkaline earth metal ions such as magnesium, calcium and barium ions, aluminium ions, zinc ions and the like ions.

The metal salts of the ionic copolymers used have usually a melt index, or MI for short, of not higher than 50 g/10 min. Preferable as the metal salts of the ionic hydrocarbon copolymers is, for instance, a sodium or potassium salt of a copolymer of ethylene with acrylic or methacrylic acid, the MI of which ranges from 0.5 to 10 g/10 min.

The metal salt of the ionic copolymer, as mentioned above, serves as a crystallization promoter of the copolymerized polyester that is the component (A), and is used in an amount of 1 to 10 parts by weight, preferably 2 to 8 parts by weight, per 100 parts by weight of the component (A). At below 1 part by weight, it has an insufficient effect upon the promotion of crystallization of the copolymerized polyester. At higher than 10 parts by weight, on the other hand, it has no increased effect upon the promotion of crystallization relative to such an increased amount and rather gives rise to deteriorations of mechanical strength and heat resistance as well as fluidity.

If desired, the composition of the present invention may contain not only other crystallization promoters, fluidity modifiers, waxes acting as release agents and the like but also various additives such as antioxidants, ultraviolet absorbers, flame retardants, impact modifiers and pigments. As the antioxidants, it is preferred to use phenolic antioxidants in combination with phosphorus-containing antioxidants so as to improve the stability of products during both processing and molding.

The first composition of the present invention may be prepared by any suitable methods rather than any special ones. For instance, the copolymerized polyester that is the component (A) may be previously mixed with the components (B) and (C) and then compounded by means of an extruder. Alternatively, the copolymerized polyester that is the component (A) may be melted and kneaded with the component (C), followed by the addition of the reinforcing substance that is the component (B). Further, the reinforcing substance that is the component (B) may be added during or after the stage of polymerization of the copolymerized polyester, followed by mixing with the component (C). Still further, the copolymerized polyester containing the component (B) may be blended with the copolymerized polyester containing the component (C).

Referring next to the second composition of the present invention, the unit (a) in the copolymerized polyester used as the components (A') and (A") is an aromatic dicarboxylic acid unit composed mainly of a terephthalic acid unit, which is the same as what is described as the unit (a) in the copolymerized polyester used for the component (A) according to the first aspect of the present invention.

The unit (b) in the copolymerized polyester used as the components (A') and (A") is a glycol unit composed mainly of an ethylene glycol unit, which is again the same as what is described as the unit (b) in the copolymerized polyester used for the component (A) according to the first aspect of the present invention.

The unit (c) in the copolymerized polyester used as the component (A') is a polytetramethylene glycol unit, which is again the same as what is described as the unit (c) in the copolymerized polyester used for the component (A) according to the first aspect of the present invention.

More specifically, the polytetramethylene glycol unit forming the unit (c) in the copolymerized polyester of the component (A') has suitably a number-average molecular weight of 400 to 4000, preferably 600 to 2000. Any deviation of the molecular weight from the above-defined scope is likely to give rise to a lowering of the rigidity of the resulting copolymerized polyester.

It is required that the content of the polytetramethylene glycol unit (c) be selected from the range of 0.2 to 20 parts by weight, preferably 0.5 to 15 parts by weight, per a total of 100 parts by weight of the units (a) and (b). No sufficient improvements are introduced in toughness and low-temperature crystallinity at below 0.2 parts by weight, whereas the melting point and rigidity of the copolymerized polyester tend to drop at higher than 20 parts by weight.

The unit (e) used as the copolymerized polyester employed for the component (A') in the second aspect of the present invention is an aliphatic dicarboxylic acid unit having 9 or more carbon atoms, which is the same as what is described as the unit (e) in the copolymerized polyester used for the component (A) according to the first aspect of the present invention.

The content of the unit (e) in the copolymerized polyester that is the component (A') is selected form the range of 0.2 to 20 parts by weight, preferably 0.5 to 15 parts by weight, per a total of 100 parts by weight of the units (a) and (b). No sufficient improvements are introduced into toughness at below 0.2 parts by weight, whereas the melting point of the obtained copolymerized polyester tends to drop with deteriorations of its rigidity at higher than 20 parts by weight.

The toughness of the copolymerized polyester is improved by modification with the polytetramethylene glycol or polyethylene glycol. However, more striking improvements in toughness are achievable by modification with the aliphatic dicarboxylic acid having 9 or more carbon atoms. This effect is unachievable by modification with an aliphatic dicarboxylic acid having 8 or less carbon atoms. Although no particular limitation is imposed upon the upper limit of the number of carbon atoms in the aliphatic dicarboxylic acids having 9 or more carbon atoms, the number of carbon atoms is usually up to 50.

Although not appreciated altogether as of today, the reason why the toughness of the resulting copolymerized polyester is more remarkably increased by modification with the aliphatic dicarboxylic acids having 9 or more carbon atoms is presumably as follows. Observation under a transmission type electronic microscope relying upon osmic acid dyeing has confirmed that the copolymerization of, e.g., a polyalkylene glycol alone with polyethylene terephthalate gives a polymerized product of a coarse phase-separation structure, while when such copolymerization is carried out in combination with the aliphatic dicarboxylic acid having 9 or more carbon atoms, the resulting polymer product is of a fine particle-dispersed structure. That is, changes in the morphology of phase separation appear to be correlated to striking improvements in toughness.

In the copolymerized polyester that is the component (A"), the polyethylene glycol forming the unit (d) has suitably a number-average molecular weight ranging from 400 to 4000, preferably 600 to 2000. When the molecular weight exceeds 4,000, the resulting copolymerized polyester tends to decrease in rigidity. When the molecular weight is less than 400, no sufficient improvement in toughness is obtained.

It is required that the content of the polyethylene glycol unit (d) be selected from the range of 0.3 to 50 parts by weight, preferably 1 to 30 parts by weight, per a total of 100 parts by weight of the units (a) and (b). At higher than 50 parts by weight, the stickiness of the copolymerized polyester increases, posing a handling problem.

It is understood that the polyethylene glycol unit (d) may be contained in the copolymerized polyester that is the component (A'). It is then suitable that the content of the polyethylene glycol unit is up to 20 parts by weight, preferably up to 15 parts by weight, per a total of 100 parts by weight of the units (a) and (b).

If the object of the present invention is otherwise achieved in the preparation of the copolymerized polyester (A') and/or (A"), the components as already mentioned may be used in combination with small amounts of other copolymerizable components, for instance, polyfunctional compounds such as triols and tetraols represented by glycerin, trimethylolpropane, pentaerythritol, hexanetriol and 1,2,6-trimethylolethane, benzene tricarboxylates represented by trimellitic acid, and trimesic acid, benzene tetracarboxylic acids such as pyromellitic acid and hydroxycarboxylic acids represented by p-hydroxybenzoic acid, p-hydroxyethoxybenzoic acid and a compound containing 3 to 4 hydroxyl and carboxyl groups; and monofunctional compounds such as aliphatic monocarboxylic acids represented by stearic acid and oleic acid and aromatic monocarboxylic acids represented by benzoic acid, diphenyl acetate and β-naphthoic acid.

No particular limitation is placed upon the methods for preparing the copolymerized polyester (A') or (A") in the compositions of the present invention. This means that such polyester may be prepared in any suitable known methods. Usually, the copolymerized polyester may be prepared by heating a mixture of reactive components at atmospheric pressure or under pressure in the presence or absence of a catalyst, preferably in an inert gas atmosphere to form an oligomer and, then, polycondensing the oligomer. In this case, the acid component that is one starting material may be used in the form of an ester-forming derivative. The reaction temperature at which the oligomer is formed may usually be selected from the range of 200 to 270° C., preferably 230 to 260° C. The polycondensation of said oligomer may occur at a pressure of up to 15 mmHg, preferably up to 1 mmHg and a temperature of about 270 to 300° C. in the presence of known catalysts such as antimony, titanium, iron, zinc, cobalt, lead, manganese and germanium.

No particular limitation is placed on the time when the polytetramethylene glycol and aliphatic dicarboxylic acid forming the units (c) and (e), respectively, in the copolymerized polyester (A') and polyethylene glycol forming the unit (d) in copolymerized polyester (A") are to be added. This means that they may be added in any stage during the preparation of the copolymerized polyester. For instance, they may be added either at the stage of esterification or ester exchange or at the stage of polycondensation. Alternatively, they may be added after polycondensation, which is in turn continued to completion.

The intrinsic viscosity of the thus obtained copolymerized polyester that is the component (A') and (A") is desirously in the range of 0.4 to 1.5 dl/g, preferably 0.5 to 1.0 dl/g, as measured at a temperature of 30° C. in a mixed solvent of phenol/tetrachloroethane (at a weight ratio of 1/1).

In the second composition of the present invention, no particular limitation is imposed upon the proportion of the copolymerized polyester components (A') and (A") to be used. In the composition comprising the copolymerized polyester components (A') and (A"), however, mixed with a total 100 parts by weight of the units (a) and (b) are 0.3 to 10 parts by weight, preferably 0.5 to 5 parts by weight of the unit (e), 0.3 to 10 parts by weight, preferably 0.5 to 5 parts by weight of the unit (c) and 0.5 to 20 parts by weight, preferably 1 to 15 parts by weight, more preferably 1 to 12 parts by weight of the unit (d). Usually, 30 to 95 % by weight of the component (A') may be used with 70 to 5 % by weight of the component (A").

The reinforcing substance used as the component (B) in the second aspect of the present invention is the same as what is described as the component (B) in the first aspect of the present invention.

It is required that the reinforcing substance that is the component (B) be added in an amount of 5 to 150 parts by weight, preferably 10 to 120 parts by weight, per a total of 100 parts by weight of the copolymerized polyesters (A') and (A"). At below 5 parts by weight, no sufficient mechanical strength, rigidity and heat resistance are obtained. In a quantity exceeding 150 parts by weight, on the other hand, no improvements in mechanical strength, rigidity and heat resistance are achieved relative to such an increased quantity and there is rather a tendency toward deteriorations of appearance and fluidity.

In the second aspect of the present invention, the metal salt of an ionic copolymer is incorporated as the component (C). This metal salt is the same as what is described as the component (C) in the first aspect of the present invention.

The metal salt of the ionic copolymer, as mentioned above, serves as a crystallization promoter of the copolymerized polyester, and is used in an amount of 1 to 10 parts by weight, preferably 2 to 8 parts by weight, per a total of 100 parts by weight of the copolymerized polyesters (A') and (A"). At below 1 part by weight, it has an insufficient effect upon the promotion of crystallization of the copolymerized polyester. At higher than 10 parts by weight, on the other hand, it has no increased effect upon the promotion of crystallization relative to such an increased amount and rather gives rise to deteriorations of mechanical strength and heat resistance as well as fluidity.

If desired, the composition of the present invention may contain not only other crystallization promoters, fluidity modifiers, waxes acting as release agents and the like but also various additives such as antioxidants, ultraviolet absorbers, flame retardants, impact modifiers and pigments. As the antioxidants, it is preferred to use phenolic antioxidants in combination with phosphorus-containing antioxidants so as to improve the stability of products during both processing and molding.

The second composition of the present invention may be prepared by any suitable methods rather than any special ones. For instance, the copolymerized polyesters (A') and (A") may be previously mixed with the components (B) and (C) and then compounded by means of an extruder. Alternatively, the copolymerized polyesters (A') and (A") may be melted and kneaded with the component (C), followed by the addition of the reinforcing substance that is the component (B). Further, the reinforcing substance that is the component (B) may be added during or after the stage of polymerization of the copolymerized polyesters (A') and (A") followed by mixing with the component (C). Still further, the copolymerized polyesters (A') and (A") containing the component (B) may be blended with the copolymerized polyester containing the component (C).

As explained above, the copolymerized polyester compositions of the present invention retain excellent heat resistance and rigidity that the glass fiber-reinforced polyethylene terephthalate compositions possess originally and are considerably improved in terms of low-temperature moldability, toughness, alkali resistance and like other factors. Thus, they are suitably usable in automotive fields, especially in the form of engine-related parts required to have heat resistance.

EXAMPLES

The present invention will now be explained in further detail specifically but not exclusively with reference to the following examples, wherein the properties of the compositions were estimated as follows.

(1) Mold-Release Characteristics (Thin Wall)

Estimation was made in terms of whether or not a boxy injection molding of 0.5 mm in thickness was easily releasable.

o: good, Δ: somewhat good, x: bad (2) Surface Gloss

Dumbbell specimens were measured on the sides counter to their gates according to JIS K-7105.

(3) Physical Properties

Flexural strength: measured according to ASTM D-638.

Flexural deformation at break: measured according to ASTM D-790.

Flexural modulus: measured according to ASTM D-790.

Izod impact strength: measured according to ASTM D-256 (with or without a notch).

Heat distortion temperature (under 18.6 kg/cm$^2$): measured according to ASTM D-648.

(4) Chemical (alkali) resistance

Flex test pieces were immersed at room temperature in an aqueous solution of 10% by weight sodium hydroxide for seven days to express changes before and after immersion in terms of flexural strength retention, weight change and appearance change.

Production Example 1

Production of Copolymerized Polyester A-1

After stirring, a slurry consisting of 87 g of terephthalic acid, 38 g of ethylene glycol, 0.005 g of phosphorous acid and 0.034 g of antimony trioxide was gradually and continuously fed into a reactor equipped with a distillation head and a condenser and was then esterified under a pressure of 2.6 kg/cm$^2$-G at 250 to 255° C. Subsequently, added to 100 g of the esterified product were 5.0 g of polyethylene glycol having a number-average molecular weight of about 1000, 2.5 g of polytetramethylene glycol having a number-average molecular weight of about 860 and 2.5 g of dimer acid (Versadyme ®52 manufactured by Henkel Hakusui Co., Ltd.) for a 10-minute reaction under normal pressure at 250° C., followed by a condensation reaction under high vacuum of up to 1 mmHg at 275° C. Upon an intrinsic viscosity [η] of 0.66 dl/g being reached, the polycondensation reaction was brought to completion to obtain a copolymerized polyester A-1.

Production Example 2

Production of Copolymerized Polyester A-2

After stirring, a slurry consisting of 87 g of terephthalic acid, 38 g of ethylene glycol, 0.005 g of phosphorous acid and 0.034 g of antimony trioxide was gradually and continuously fed into a reactor equipped with a distillation head and a condenser, and was then esterified under a pressure of 2.6 kg/cm$^2$-G at 250 to 255° C. Subsequently, added to 100 g of the esterified product were 3 g of polytetramethylene glycol having a number-average molecular weight of about 860 and 3 g of dimer acid (Versadyme ® 52 manufactured by Henkel Hakusui Co., Ltd.) for a 10-minute reaction under normal pressure at 250° C., followed by a condensation reaction under high vacuum of up to 1 mmHg at 275° C. Upon an intrinsic viscosity [η] of 0.71 dl/g being reached, the polycondensation reaction was brought to completion to obtain a copolymerized polyester A-2.

Production Example 3

Production of Copolymerized Polyester A-3

After stirring, a slurry consisting of 87 g of terephthalic acid, 38 g of ethylene glycol, 0.005 g of phosphorous acid and 0.034 g of anitmony trioxide was gradually and continuously fed into a reactor equipped with a distillation head and a condenser, and was then esterified under a pressure of 2.6 kg/cm$^2$-G at 250 to 255° C. Subsequently, added to 100 g of the esterified product were 30 g of polyethylene glycol having a number-average molecular weight of about 1000 for a 20-minute reaction under normal pressure at 250° C., followed by a condensation reaction under high vacuum of up to 1 mmHg. Upon an intrinsic viscosity [η] of 0.80 dl/g being reached, the polycondensation reaction was brought to completion to obtain a copolymerized polyester A-3.

Examples 1 to 5 and Comparative Examples 1 to 4

The copolymerized polyester products obtained in Production Examples 1 to 3, PET or PBT were dried at 140° C. for 5 hours or longer. These polyester products were preblended with glass chopped strands of 3 mm in length and 10 μm in diameter and a sodium salt of an ethylene/methacrylic acid copolymer (Himilan 1707 manufactured by Mitsui Du Pont Polychemical Co., Ltd.) in the proportions specified in Table 1 and further with 0.3 parts by weight of a phenolic antioxidant (available under the trade name of Irganox 1010 from Chiba Geigy Co., Ltd.) and 0.3 parts by weight of a phosphate antioxidant (available under the trade mark of PEP-36 from Adeka Argus Chemical Co., Ltd.), and the products were then melted and kneaded into pellets through a 57-mmφ biaxial extruder with a vent at a cylinder temperature of 270° C.

Next, the obtained pellets were pre-dried at 140° C. for 5 hours or longer, and were thereafter injection-molded at a cylinder temperature of 270° C. and a mold temperature of 90° C. to prepare test pieces, the properties of which were in turn estimated. The results are set out in Table 1.

TABLE 1

| Composition | | | | | Flexural Properties | | |
|---|---|---|---|---|---|---|---|
| Copolymerized polyester Parts by | (B) Glass fibers (parts by | (C) Ionomers (parts by | Mold-release character- | Surface gloss | Flexural strength | Flexural distortion at break | Flexural modulus |

TABLE 1-continued

| | Type | weight | weight) | weight) 1) | istics | (%) | (kg/mm²) | (%) | (kg/cm²) |
|---|---|---|---|---|---|---|---|---|---|
| Example 1 | A-1 | 100 | 45 | 6 | o | 85 | 2,050 | 3.9 | 83,500 |
| Example 2 | A-1 | 100 | 20 | 6 | Δ | 93 | 1,430 | 5.6 | 51,500 |
| Example 3 | A-1 | 100 | 100 | 6 | o | 77 | 2,540 | 2.7 | 111,000 |
| Example 4 | A-1 | 100 | 45 | 2 | o | 80 | 2,130 | 3.7 | 83,500 |
| Example 5 | A-1 | 100 | 45 | 8 | o | 87 | 1,960 | 4.0 | 82,500 |
| Comparative Example 1 | A-2 | 100 | 45 | 6 | Δ | 70 | 2,100 | 3.4 | 87,000 |
| Comparative Example 2 | A-3 | 100 | 45 | 6 | x | 85 | 1,200 | 5.0 | 50,000 |
| Comparative Example 3 | PET | 100 | 45 | 6 | x | 15 | 2,150 | 2.5 | 101,000 |
| Comparative Example 4 | PBT | 100 | 45 | 6 | o | 35 | 2,000 | 3 | 90,000 |

| | Izod impact strength | | Heat distortion temperature (°C.) | Alkali Resistance | | |
|---|---|---|---|---|---|---|
| | With notch (kg·cm/cm) | Without notch (kg·cm/cm) | | Flexural strength retention (%) | Weight change (%) | Appearance change |
| Example 1 | 12.5 | 87 | 225.0 | 82 | −7.2 | A |
| Example 2 | 7.2 | 45 | 208.0 | 66 | −9.0 | A |
| Example 3 | 13.5 | 105 | 228.5 | 84 | −6.2 | A |
| Example 4 | 12.2 | 82 | 226.0 | 79 | −7.0 | A |
| Example 5 | 12.2 | 86 | 225.0 | 82 | −7.0 | A |
| Comparative Example 1 | 11.0 | 75 | 224.0 | 30 | −13.0 | B |
| Comparative Example 2 | 16.0 | 110 | 185.0 | 20 | −14.0 | C |
| Comparative Example 3 | 8.0 | 55 | 235.0 | 8 | −15.0 | B |
| Comparative Example 4 | 10.0 | 70 | 210.0 | — | — | — |

Note 1) Ionomer: Sodium salt of ethylene/methacrylic acid copolymer (Himilan 1707, manufactured by Mitsui Du Pont Polychemical Co., Ltd.)
A: Slight whitening found with no geometrical change.
B: Noticeable whitening found with remarkable surface roughness.
C: Noticeable whitening found with remarkable swelling.

Production Example 4

Production of Copolymerized Polyester A'

After stirring, a slurry consisting of 87 g of terephthalic acid, 38 g of ethylene glycol, 0.005 g of phosphorous acid and 0.034 g of antimony trioxide was gradually and continuously fed into a reactor equipped with a distillation head and a condenser, and was then esterified under a pressure of 2.6 kg/cm²-G at 250 to 255° C. Subsequently, added to 100 g of the esterified product were 3 g of polytetramethylene glycol having a number-average molecular weight of about 860 and 3 g of dimer acid (Versadyme ®52 manufactured by Henkel Hakusui Co., Ltd.) for a 10-minute reaction under normal pressure at 250° C., followed by a condensation reaction under high vacuum of up to 1 mmHg at 275° C. Upon an intrinsic viscosity [η] of 0.71 dl/g being reached, the polycondensation reaction was brought to completion to obtain a copolymerized polyester A'.

Production Example 5

Production of Copolymerized Polyester A''

After stirring, a slurry consisting of 87 g of terephthalic acid, 35 g of ethylene glycol, 0.005 g of phosphorous acid and 0.034 g of antimony trioxide was gradually and continuously fed into a reactor equipped with a distillation head and a condenser, and was then esterified under a pressure of 2.6 kg/cm²-G at 250 to 255° C. Subsequently, added to 100 g of the esterified product were 30 g of polyethylene glycol having a number-average molecular weight of about 1000 for a 20-minute reaction under normal pressure at 250° C., followed by a condensation reaction under high vacuum of up to 1 mmHg. Upon an intrinsic viscosity [η] of 0.80 dl/g being reached, the polycondensation reaction was brought to completion to obtain a copolymerized polyester A''.

Examples 6 to 13 and Comparative Examples 5 to 8

The copolymerized polyester products obtained in Production Examples 4 to 5, PET or PBT were dried at 140° C. for 5 hours or longer. 100 parts by weight of these polyester products were pre-blended with glass chopped strands of 3 mm in length and 10 μm in diameter and a sodium salt of an ethylene/methacrylic acid copolymer (Himilan 1707 manufactured by Mitui Du Pont Polychemical Co., Ltd.) in the proportions specified in Table 2 and further with 0.3 parts by weight of a phenolic antioxidant (available under the trade name of Irganox 1010 from Chiba Geigy Co., Ltd.) and 0.3 parts by weight of a phosphate antioxidant (available under the trade mark of PEP-36 from Adeka Argus Chemical Co., Ltd.), and the products were then melted and kneaded into pellets through a 57-mmφ biaxial extruder with a vent at a cylinder temperature of 270° C.

Next, the obtained pellets were pre-dried at 140° C. for 5 hours or longer, and were thereafter injection-molded at a cylinder temperature of 270° C. and a mold temperature of 90° C. to prepare test pieces, the properties of which were in turn estimated. The results are set out in Table 2.

TABLE 2

| Composition |
|---|
| (B) |

TABLE 2-continued

| | Copolymerized polyester | | | | | Glass fibers (parts by weight) | (C) Ionomers (parts by weight)[3] | Mold-release characteristics | Surface gloss (%) |
|---|---|---|---|---|---|---|---|---|---|
| | | Parts by weight | Content per a total of 100 parts by weight of units (a) and (e) | | | | | | |
| | type | | (c) PTMG[1] | (e) Dimer acid | (d) PEG[2] | | | | |
| Example 6 | A' | 80 | 2.5 | 2.5 | 5.1 | 45 | 6 | o | 85 |
| | A'' | 20 | | | | | | | |
| Example 7 | A' | 60 | 1.9 | 1.9 | 10.6 | 45 | 6 | o | 87 |
| | A'' | 40 | | | | | | | |
| Example 8 | A' | 90 | 2.8 | 2.8 | 2.5 | 45 | 6 | o | 82 |
| | A'' | 10 | | | | | | | |
| Example 9 | A' | 80 | 2.5 | 2.5 | 5.1 | 20 | 6 | Δ | 95 |
| | A'' | 20 | | | | | | | |
| Example 10 | A' | 80 | 2.5 | 2.5 | 5.1 | 100 | 6 | o | 75 |
| | A'' | 20 | | | | | | | |
| Example 11 | A' | 80 | 2.5 | 2.5 | 5.1 | 45 | 2 | o | 80 |
| | A'' | 20 | | | | | | | |
| Example 12 | A' | 80 | 2.5 | 2.5 | 5.1 | 45 | 8 | o | 86 |
| | A'' | 20 | | | | | | | |
| Example 13 | A' | 50 | 1.7 | 1.7 | 13.5 | 45 | 6 | o | 88 |
| | A'' | 50 | | | | | | | |
| Comparative Example 5 | A' | 100 | 3 | 3 | — | 45 | 6 | Δ | 70 |
| Comparative Example 6 | A'' | 100 | — | — | 30 | 45 | 6 | x | 85 |
| Comparative Example 7 | PET | 100 | — | — | — | 45 | 6 | x | 15 |
| Comparative Example 8 | PBT | 100 | — | — | — | 45 | 6 | o | 35 |

| | Flexural properties | | | Izod impact strength | | Heat distortion temperature (°C.) | Alkali Resistance | | |
|---|---|---|---|---|---|---|---|---|---|
| | Flexural strength (kg/mm$^2$) | Flexural distortion at break (%) | Flexural modulus (kg/cm$^2$) | With notch (kg·cm/cm) | Without notch (kg·cm/cm) | | Flexural strength retention (%) | Weight change (%) | Appearance change |
| Example 6 | 2,000 | 3.8 | 83,000 | 12.0 | 82 | 220.0 | 81 | −7.0 | A |
| Example 7 | 1,800 | 4.3 | 78,000 | 13.0 | 90 | 218.0 | 78 | −7.5 | A |
| Example 8 | 2,100 | 3.6 | 85,000 | 11.5 | 75 | 220.0 | 83 | −6.8 | A |
| Example 9 | 1,400 | 5.5 | 51,000 | 7.0 | 40 | 205.0 | 68 | −9.5 | A |
| Example 10 | 2,500 | 2.6 | 111,000 | 13.5 | 100 | 225.0 | 85 | −6.0 | A |
| Example 11 | 2,100 | 3.6 | 83,500 | 12.0 | 78 | 220.0 | 78 | −7.2 | A |
| Example 12 | 1,950 | 3.9 | 82,000 | 12.0 | 84 | 220.0 | 81 | −7.0 | A |
| Example 13 | 1,650 | 4.5 | 70,000 | 13.5 | 95 | 210.0 | 65 | −9.0 | A |
| Comparative Example 5 | 2,100 | 3.4 | 87,000 | 11.0 | 75 | 224.0 | 30 | −13.0 | B |
| Comparative Example 6 | 1,200 | 5.0 | 50,000 | 16.0 | 110 | 185.0 | 20 | −14.0 | C |
| Comparative Example 7 | 2,150 | 2.5 | 101,000 | 8.0 | 55 | 235.0 | 8 | −15.0 | B |
| Comparative Example 8 | 2,000 | 3.1 | 90,000 | 10.0 | 70 | 210.0 | — | — | — |

Note
[1] PTMG: Polytetramethylene Glycol
[2] PEG: Polyethylene Glycol
[3] Ionomer: Sodium salt of ethylene/methacrylic acid copolymer (Himilan 1707 manufactured by Mitsui Du Pont Polychemical Co., Ltd.)
A: Slight whitening found with no geometrical change.
B: Noticeable whitening found with remarkable surface roughness.
C: Noticeable whitening found with remarkable swelling.

What is claimed is:

1. A copolymerized polyester composition which comprises
   (A) 100 parts by weight of a copolymerized polyester comprising
   (a) an aromatic dicarboxylic acid unit comprising mainly a terephthalic acid unit,
   (b) a glycol unit comprising mainly an ethylene glycol unit,
   (c) a polytetramethylene glycol unit,
   (d) a polyethylene glycol unit and
   (e) an aliphatic dicarboxylic acid unit having 9 or more carbon atoms,
   wherein 0.3 to 10 parts by weight of said unit (c), 0.5 to 20 parts by weight of said unit (d) and 0.3 to 10 parts by weight of said unit (e) are contained per a total of 100 parts by weight of said units (a) and (b),
   (B) 5 to 150 parts by weight of a reinforcing substance and
   (C) 1 to 10 parts by weight of a metal salt of an ionic copolymer.

2. The copolymerized polyester composition as claimed in claim 1 wherein the polytetramethylene glycol unit (c) comprises polytetramethylene glycol having a number-average molecular weight in the range of 400 to 4,000.

3. The copolymerized polyester composition as claimed in claim 1 wherein the polyethylene glycol unit (d) comprises polyethylene glycol having a number-average molecular weight in the range of 400 to 4000.

4. The polymerized polyester composition as claimed in claim 1 wherein the aliphatic dicarboxylic acid unit comprises a dimer acid or a hydrogenated product thereof.

5. The copolymerized polyester composition as claimed in claim 1 wherein the reinforcing substance is a glass fiber or carbon fiber.

6. The copolymerized polyester composition as claimed in claim 1 wherein the metal salt of the ionic copolymer is a sodium salt or a potassium salt of a copolymer of ethylene with acrylic or methacrylic acid, said copolymer having a melt index of from 0.5 to 10 g/10 minutes.

7. The copolymerized polyester composition as claimed in claim 1, wherein said aromatic dicarboxylic acid unit (a) comprises terephthalic acid or terephthalic acid and less than 10 mole % of an aromatic dicarboxylic acid selected from the group consisting of isophthalic acid, naphthalene-2,6-dicarboxylic acid, naphthalene-1,5-dicarboxylic acid, diphenyl-4,4'-dicarboxylic acid, methyl terephthalate, methyl isophthalate, diphenyl ether-4,4'-dicarboxylic acid, diphenyl thioether-4,4'-dicarboxylic acid, diphenylsulfone-4,4'-dicarboxylic acid, diphenylketone-4,4'-dicarboxylic acid, 2,2-diphenylpropane-4,4-dicarboxylic acid and mixtures thereof.

8. The copolymerized polyester composition as claimed in claim 7 wherein said glycol unit (b) comprises ethylene glycol or ethylene glycol and less than 10 mole % of a glycol selected from the group consisting of diethylene glycol, 1,2-propylene glycol, 1,3-propanediol, 1,3-butanediol, 1,4-butanediol, 1,5-pentanediol, 1,6-hexanediol, 2,2-dimethyl-1,3-propanediol, 1,4-cyclohexanediol, 1,4-cyclohexane dimethanol, hydroquinone, resorcin and mixtures thereof.

9. The copolymerized polyester composition as claimed in claim 8 wherein said polytetramethylene glycol unit (c) comprises polytetramethylene glycol having a number-average molecular weight of 600 to 2000 and said polyethylene glycol unit (d) comprises polyethylene glycol having a number-average molecular weight of 600 to 2000.

10. The copolymerized polyester composition as claimed in claim 9, wherein said copolymerized polyester (A) comprises 0.5 to 5 parts by weight of said polytetramethylene glycol unit (c) and 1 to 15 parts by weight of said polyethylene glycol unit (d) per a total of 100 parts by weight of said (a) and said (b).

11. The copolymerized polyester composition as claimed in claim 10, wherein said aliphatic dicarboxylic acid (e) comprises an aliphatic dicarboxylic acid having 9 or more carbon atoms selected from the group consisting of azelaic acid, sebacic acid, decane dicarboxylic acid, brassylic acid, dodecane dicarboxylic acid, hexadecane dicarboxylic acid and eicosane dicarboxylic acid and wherein said (e) is in an amount of 0.5 to 5 parts by weight per a total of 100 parts by weight of said (a) and said (b).

12. The copolymerized polyester composition as claimed in claim 10, wherein said aliphatic dicarboxylic acid (e) comprises a dimer acid obtained from an unsaturated fatty acid having 18 carbon atoms.

13. The copolymerized polyester composition as claimed in claim 10, wherein said reinforcing substance (B) is selected from the group consisting of glass, carbon, metal carbide, metal nitride, potassium titanate, aramid, phenolic resin, talc, clay, kaoline, mica, asbestos, wollastonite, calcium silicate, silica and graphite, and said (B) is in an amount of 10 to 120 parts by weight per 100 parts by weight of said copolymerized polyester (A).

14. The copolymerized polyester composition as claimed in claim 13, wherein said metal salt of an ionic copolymer (C) comprises 2 to 8 parts by weight of a sodium salt or a potassium salt of a copolymer of ethylene with acrylic acid or methacrylic acid, having a melt index 0.5 to 10 g/10 minutes.

* * * * *